United States Patent
Aoyanagi et al.

(10) Patent No.: US 12,296,895 B2
(45) Date of Patent: May 13, 2025

(54) VEHICLE WITH EMBOSSED SURFACE OF DIRECTIONALITY PATTERN ON LOWER SURFACE OF VEHICLE BODY, AND UNDER COVER MEMBER FOR VEHICLE

(71) Applicant: SUBARU CORPORATION, Tokyo (JP)

(72) Inventors: Hiroki Aoyanagi, Tokyo (JP); Hideki Hata, Tokyo (JP); Masaya Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 326 days.

(21) Appl. No.: 17/929,539

(22) Filed: Sep. 2, 2022

(65) Prior Publication Data

US 2023/0091761 A1    Mar. 23, 2023

(30) Foreign Application Priority Data

Sep. 23, 2021 (JP) .................. 2021-154934

(51) Int. Cl.
*B62D 35/02* (2006.01)
*B62D 25/20* (2006.01)

(52) U.S. Cl.
CPC ............. *B62D 35/02* (2013.01); *B62D 25/20* (2013.01)

(58) Field of Classification Search
CPC .... B62D 35/02; B62D 25/20; B62D 25/2072; Y02T 10/82
See application file for complete search history.

(56) References Cited

U.S. PATENT DOCUMENTS

| 8,814,251 | B2 * | 8/2014 | Matsuyama | B62D 25/20 296/180.1 |
| 9,033,405 | B2 * | 5/2015 | Hirooka | B62D 25/2036 296/193.07 |
| 9,802,241 | B2 * | 10/2017 | Zielke | E04C 2/08 |
| 10,836,442 | B1 * | 11/2020 | Grattan | B62D 25/20 |
| 11,008,053 | B2 * | 5/2021 | Shiogai | B60R 13/04 |
| 11,859,645 | B2 * | 1/2024 | Aoyanagi | F15D 1/12 |
| 2008/0018136 | A1 | 1/2008 | Yamazaki | |
| 2010/0159204 | A1 * | 6/2010 | Van Merksteijn | F15D 1/12 428/169 |
| 2019/0291790 | A1 * | 9/2019 | Riggs | B62D 37/02 |
| 2022/0396228 | A1 * | 12/2022 | Whitehead | B62D 35/02 |

FOREIGN PATENT DOCUMENTS

| DE | 102006046814 A1 * | 4/2008 | ............. B62D 35/02 |
| JP | 2008-024047 A | 2/2008 | |
| JP | 2008-247144 A | 10/2008 | |

OTHER PUBLICATIONS

English translation of DE102006046814A1 (Year: 2020).*

* cited by examiner

*Primary Examiner* — Lori Lyjak
(74) *Attorney, Agent, or Firm* — Smith, Gambrell & Russell, LLP

(57) ABSTRACT

A vehicle capable of traveling with a embossed surface of a directionality pattern includes a vehicle body and an under cover member. The under cover member is disposed on one or both of a front portion and a rear portion of a lower surface of the vehicle body. The embossed surface of the directionality pattern is formed on a plane portion of the under cover member. The embossed surface of the directionality pattern is configured to accelerate an airflow along a fore-and-aft direction of the vehicle body.

20 Claims, 3 Drawing Sheets

VEHICLE WITH EMBOSSED SURFACE OF DIRECTIONALITY PATTERN ON LOWER SURFACE OF VEHICLE BODY, AND UNDER COVER MEMBER FOR VEHICLE

CROSS-REFERENCE TO RELATED APPLICATIONS

The present application claims priority from Japanese Patent Application No. 2021-154934 filed on Sep. 23, 2021, the entire contents of which are hereby incorporated by reference.

BACKGROUND

The disclosure relates to a vehicle with a embossed surface of a directionality pattern on a lower surface of a vehicle body, and to an under cover member for the vehicle.

Airflows are generated around a vehicle body of a vehicle during traveling and cause air resistance.

Japanese Unexamined Patent Application Publication (JP-A) No. 2008-247144 discloses that a plurality of circular dimples are continuously formed highly densely in an under cover that constitutes a lower surface of a vehicle body. Thus, vortices are positively generated at the circular dimples in such a manner that airflows running beneath the vehicle body from the front to the rear can be prevented from being separated from the lower surface of the vehicle body, thereby reducing air resistance.

JP-A 2008-024047 discloses that an under cover where an array of a plurality of dimples are formed is disposed on a center portion of a lower surface of a vehicle body in a fore-and-aft direction. Thus, vortices are positively generated at the dimples in such a manner that airflows running beneath the vehicle body from the front to the rear can be prevented from being separated from the lower surface of the vehicle body, thereby reducing air resistance.

SUMMARY

An aspect of the disclosure provides a vehicle capable of traveling with a embossed surface of a directionality pattern. The vehicle includes a vehicle body having a lower surface that has a front portion and a rear portion, the vehicle body comprising one or more under cover members disposed on one or both of the front portion and the rear portion. The embossed surface of the directionality pattern is formed on one or more plane portions of the one or more under cover members. The embossed surface of the directionality pattern is configured to accelerate an airflow along a fore-and-aft direction of the vehicle body.

An aspect of the disclosure provides an under cover member for a vehicle body of a vehicle capable of traveling. The under cover member includes a plane portion having a embossed surface of a directionality pattern. The embossed surface of the directionality pattern is configured to accelerate an airflow along a fore-and-aft direction of the vehicle body. The under cover member is configured to be disposed on at one or both of a front portion and a rear portion of a lower surface of the vehicle body.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In traveling of a vehicle, more than simply reducing air resistance is to be expected.

For example, when a large amount of airflows running beneath a vehicle body tend to be stagnant under the vehicle body, the vehicle body is more likely to be pressed up and float, which may degrade traveling performance of the vehicle, such as steering responsiveness and stability of straightforward travel.

As disclosed in JP-A No. 2008-247144, even when the plurality of circular dimples are continuously formed densely in the under cover member that constitutes the lower surface of the vehicle body, airflow directions are not limited in the effect of accelerating the airflows by the plurality of circular dimples densely formed so that it is considered difficult to effectively prevent the above-mentioned traveling performance from being degraded. For example, regarding airflows along a vehicle width direction as well, the effect of accelerating the airflows may be produced.

As disclosed in JP-A 2008-024047, even when the array of the plurality of circular dimples are formed in the under cover member disposed on the center portion of the lower surface of the vehicle body in the fore-and-aft direction, it may be difficult to effectively prevent the front and the rear of the vehicle body from floating.

In this manner, regarding the vehicle, it is desirable to improve the airflows beneath the vehicle body, for example, so as to enhance the traveling performance.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
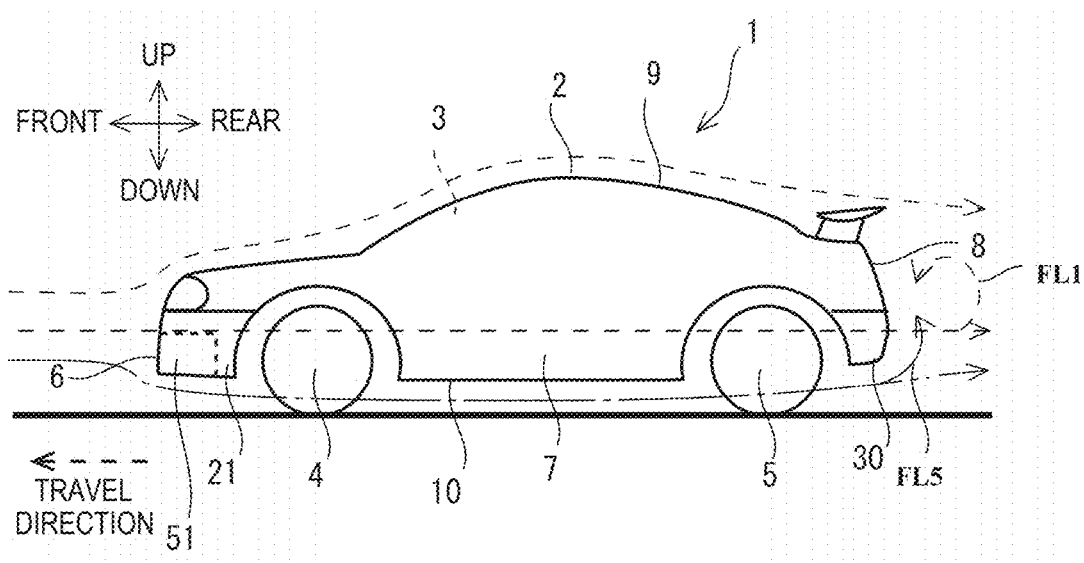
FIG. 1 is a schematic side view of an automobile according to an embodiment of the disclosure.

FIG. 1 is a schematic side view of an automobile 1 according to an embodiment of the disclosure.

Figure 2:
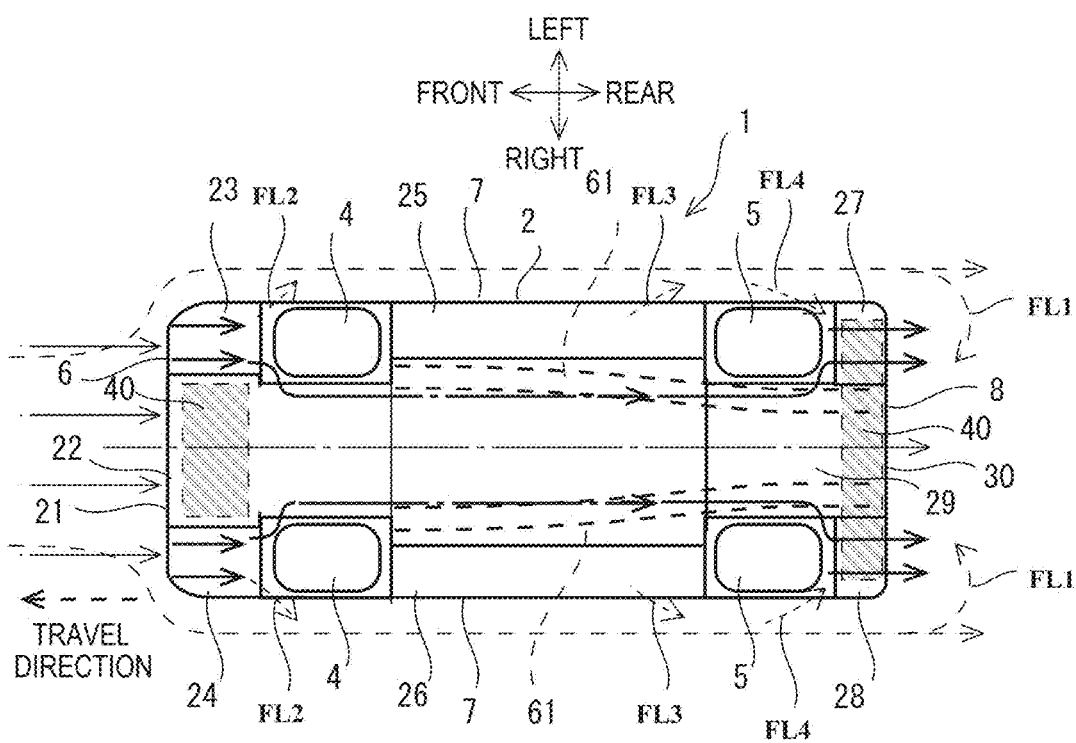
FIG. 2 is a schematic bottom view of the automobile in FIG. 1.

FIG. 2 is a schematic bottom view of the automobile 1 in FIG. 1.

The automobile 1 is an example of the vehicle. The automobile 1 includes a vehicle body 2. The vehicle body 2 includes an occupant cabin 3 where occupants aboard are seated. A pair of front wheels 4 are disposed at a front side of the occupant cabin 3. A pair of rear wheels 5 are disposed at a rear side of the occupant cabin 3.

The automobile 1 basically travels forward by an occupant's manual operation or self-driving, and changes a travel direction to the right or the left in accordance with steering. Also, the automobile 1 can travel rearward, rearward to the right, and rearward to the left.

Airflows are generated around the vehicle body 2 during traveling. Air in front of the vehicle body 2 in the travel direction strikes against a front surface 6 of the vehicle body 2, and then, the air is divided sideward, upward, and downward of the vehicle body 2, and flows rearward along side surfaces 7, an upper surface 9, and a lower surface 10 of the vehicle body 2. A plurality of airflows thus divided join behind the vehicle body 2. At this time, behind the vehicle body 2, some of the airflows running along the left and right side surfaces 7 of the vehicle body 2, for example, are rolled in to run toward a rear surface 8 of the vehicle body 2 so as to generate rolled-in flows FL1. Also, some of the airflows running along the lower surface 10 of the vehicle body 2 are rolled in to run toward the rear surface 8 of the vehicle body 2 so as to generate rolled-in flows FL5. These airflows become air resistance that hinders traveling of the automobile 1.

In view of this, the automobile 1 includes, as an under cover member configured to guide the airflows around the vehicle body 2 and reduce the air resistance, a plurality of panels and covers that constitute an outermost surface of the lower surface 10 of the vehicle body 2.

For example, as illustrated in FIG. 2, the following plurality of panels and covers are disposed on the lower surface 10 of the automobile 1: a front under center panel 22; a left front under side cover 23; a right front under side cover 24; a left center under side cover 25; a right center under side cover 26; a rear under center panel 29; a left rear under side cover 27; and a right rear under side cover 28. These panels and covers may be formed of a resin material by injection molding, for example.

The front under center panel 22 is disposed on a front center portion of the lower surface 10 of the vehicle body 2. The front under center panel 22 is disposed from a front edge of a front bumper 21 disposed on a front-surface lower portion of the vehicle body 2 to a portion between the pair of front wheels 4. The front under center panel 22 extends from the front bumper 21 to the vicinity of rear edges of wheelhouses for the pair of front wheels 4. A pair of mufflers 61 are exposed from the lower surface 10 of the vehicle body 2 at a rear side of the front under center panel 22. The pair of mufflers 61 extend across a center portion of the lower surface 10 of the vehicle body 2 until rear ends of the mufflers 61 reach a rear bumper 30 on a rear-surface lower portion of the vehicle body 2.

The left front under side cover 23 is disposed in a left front corner on the lower surface 10 of the vehicle body 2. On the left of the front under center panel 22, the left front under side cover 23 is disposed from the front under center panel 22 to the left side surface 7 of the vehicle body 2. The wheelhouse for the left front wheel 4 is located at a rear side of the left front under side cover 23.

The right front under side cover 24 is disposed in a right front corner on the lower surface 10 of the vehicle body 2. On the right of the front under center panel 22, the right front under side cover 24 is disposed from the front under center panel 22 to the right side surface 7 of the vehicle body 2. The wheelhouse for the right front wheel 4 is located at a rear side of the right front under side cover 24.

The left center under side cover 25 is disposed on the lower surface 10 of the vehicle body 2 along a left edge of the left side surface 7 and provided in a section between the wheelhouse for the left front wheel 4 and the wheelhouse for the left rear wheel 5. The left muffler 61 is located on a center side of the left center under side cover 25 in a vehicle width direction, which is a lateral direction of the vehicle body 2.

The right center under side cover 26 is disposed on the lower surface 10 of the vehicle body 2 along a right edge of the right side surface 7 and provided in a section between the wheelhouse for the right front wheel 4 and the wheelhouse for the right rear wheel 5. The right muffler 61 is located on a center side of the right center under side cover 26 in the vehicle width direction.

The left rear under side cover 27 is disposed in a left rear corner on the lower surface 10 of the vehicle body 2. At a front side of the rear bumper 30 disposed on the rear-surface lower portion of the vehicle body 2, the left rear under side cover 27 is disposed from the left muffler 61 to the left side surface 7 of the vehicle body 2. The wheelhouse for the left rear wheel 5 is located at a front side of the left rear under side cover 27.

The right rear under side cover 28 is disposed in a right rear corner on the lower surface 10 of the vehicle body 2. At a front side of the rear bumper 30 disposed on the rear-surface lower portion of the vehicle body 2, the right rear under side cover 28 is disposed from the right muffler 61 to the right side surface 7 of the vehicle body 2. The wheelhouse for the right rear wheel 5 is located at a front side of the right rear under side cover 28.

The rear under center panel 29 is interposed between the left rear under side cover 27 and the right rear under side cover 28. The rear under center panel 29 is disposed from a position between the rear wheels 5 to a rear edge of the rear bumper 30 disposed on the rear-surface lower portion of the vehicle body 2. Rear end portions of the pair of mufflers 61 are covered with the rear under center panel 29.

The plurality of panels and covers make the whole lower surface 10 of the automobile 1 substantially flat. Thus, airflows running beneath the automobile 1 can smoothly advance from the front to the rear along the substantially flat lower surface 10 of the automobile 1, and the airflows can be let out from the rear of the automobile 1.

However, for example, the pair of front wheels 4 and the pair of rear wheels 5 protrude downward from the lower surface 10 of the vehicle body 2. In many cases, the lower surface 10 of the vehicle body 2 has, as a whole, a convex shape where the center portion is lower than the front portion and the rear portion. These factors hinder some of the airflows running beneath the automobile 1 from advancing rearward. As a result, in some cases, the airflows that have run beneath the automobile 1 partly become airflows FL2 and FL3 jetting outward in the vehicle width directions from beneath the vehicle body 2. When the airflows FL2 and FL3 jet outward in the vehicle width directions from beneath the vehicle body 2, the airflows that have jetted out may join airflows running along the side surfaces 7 of the vehicle body 2 and make turbulent the airflows along the side surfaces 7 of the vehicle body 2.

In view of this, in this embodiment, a embossed surface 40 of a directionality pattern that can accelerate airflows in a fore-and-aft direction is formed on some of the plurality of panels and covers that constitute the lower surface 10 of the vehicle body 2. Thus, it can be expected to increase a flow speed and a flow rate of the airflows running rearward beneath the vehicle body 2 so as to strengthen the airflows running rearward. It can be expected to decrease amounts of the airflows FL2 and FL3 jetting outward in the vehicle width directions from beneath the vehicle body 2.

Besides, the embossed surface 40 of the directionality pattern is not formed on the whole lower surface 10 of the vehicle body 2 but formed on part of the lower surface 10 of the vehicle body 2, that is, the front portion and the rear portion of the lower surface 10. In particular, the embossed surface 40 of the directionality pattern in this embodiment is partly formed on plane portions of the plurality of panels and covers that constitute the lower surface 10 of the vehicle body 2 except for uneven portions of the panels and covers. The plane portions are desirably portions parallel to a road surface. However, this is not to be construed in a limiting sense. Thus, the airflows beneath the lower surface 10 of the vehicle body 2 may have a difference in flow speed in the fore-and-aft direction between the center portion in the vehicle width direction and the portions on opposite sides of the center portion. Balance in the airflows beneath the lower surface 10 of the vehicle body 2 becomes different from that beneath the lower surface 10 of the vehicle body 2 without the embossed surface 40 of the directionality pattern. Airflows beneath the opposite side portions in the vehicle width directions are more likely to be drawn into airflows beneath the center portion. The airflows along the lower surface 10 of the vehicle body 2 of the traveling automobile 1 can be improved. For example, the amounts of the airflows FL2 and FL3 jetting outward in the vehicle width directions from beneath the vehicle body 2 may be effectively decreased.

Figure 3:
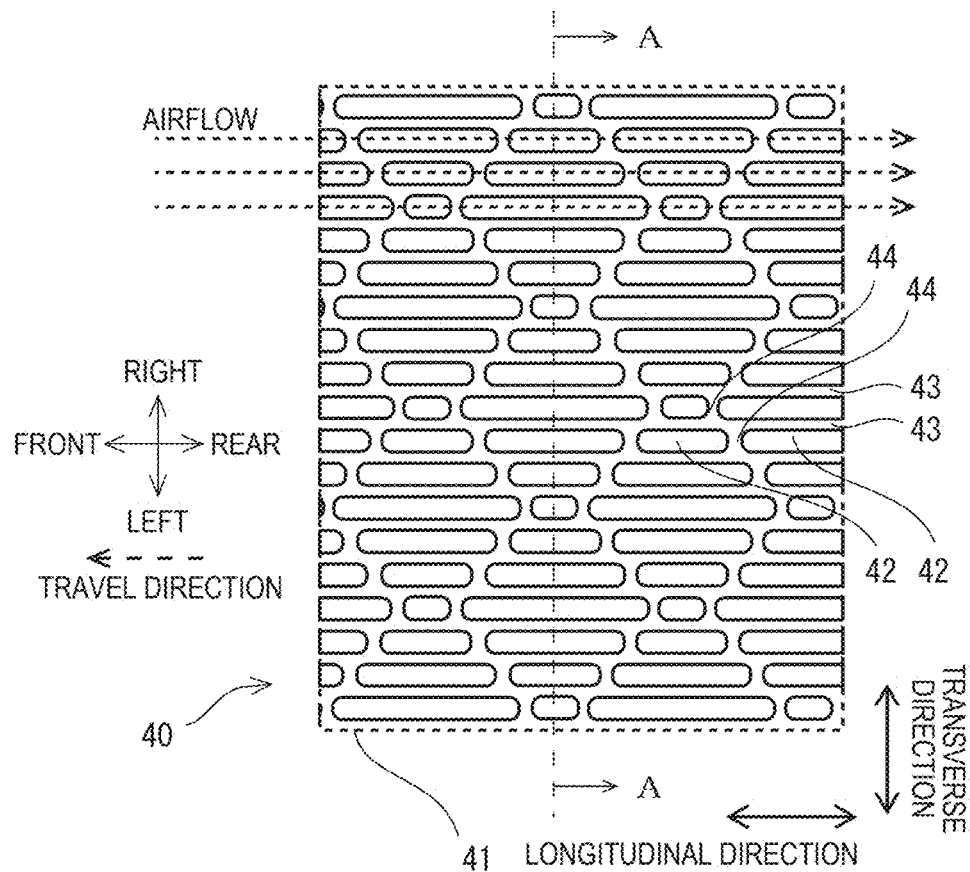
FIG. 3 is a schematic plan view of a embossed surface of a directionality pattern, which is disposed on a lower surface of the automobile in FIG. 1 and capable of accelerating airflows in one direction more than airflows in another direction intersecting the one direction.

FIG. 3 is a schematic plan view of the embossed surface 40 of the directionality pattern, which is disposed on the lower surface 10 of the automobile 1 in FIG. 1 and capable of accelerating airflows in one direction more than airflows in another direction intersecting the one direction.

Figure 4:
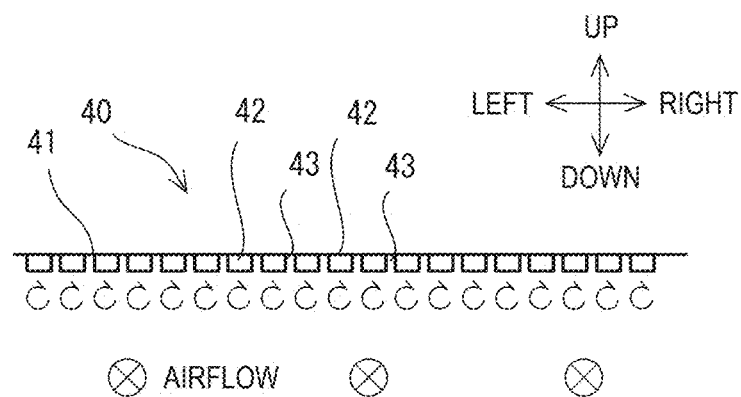
FIG. 4 is a schematic cross-sectional view of the embossed surface of the directionality pattern in FIG. 3, taken along line A-A.

FIG. 4 is a schematic cross-sectional view of the embossed surface 40 of the directionality pattern in FIG. 3, taken along line A-A.

The embossed surface 40 of the directionality pattern in FIGS. 3 and 4 includes a base surface 41 and a plurality of minute ribs 42 protruding from the base surface 41.

The embossed surface 40 may be formed at the same time as molding of the panels or the covers disposed on the lower surface 10 of the automobile 1. The base surface 41 may be a sheet adhered to outer surfaces of the panels or the covers disposed on the lower surface 10 of the automobile 1.

The base surface 41 is an outer surface of each of the panels or the covers where the embossed surface 40 of the directionality pattern is disposed. The base surface 41 is basically a plane. However, this is not to be construed in a limiting sense.

The plurality of ribs 42 include elongated ribs. The elongated ribs 42 have elongated elliptic shapes with opposite ends rounded in longitudinal directions. The elongated ribs 42 may have a cubic shape of a quadrilateral cross section, for example.

A protruding height of the ribs 42 from the base surface 41 may be equal to or longer than several micrometers, for example.

The plurality of ribs 42 are formed linearly in the longitudinal direction of the elongated ribs 42 over the entire base surface 41. The plurality of ribs 42 are disposed in a plurality of lines in a transverse direction of the elongated ribs 42. First recesses 43 are formed as minute gaps between adjacent pairs of the plurality of ribs 42 in the transverse direction. Over the entire base surface 41, the first recesses 43 extend linearly along the longitudinal direction of the elongated ribs 42 so as to form continuous linear gaps.

The plurality of ribs 42 may include ribs of different lengths from those of the elongated ribs, for example, ribs of a regular cubic shape and a columnar shape.

In FIG. 3, the plurality of ribs 42 of different lengths in the transverse direction of the elongated ribs 42 are arranged to constitute a rhombic arrangement pattern. A plurality of the rhombic arrangement patterns are closely disposed on the base surface 41.

With this arrangement, second recesses 44 are formed as minute gaps between adjacent pairs of the plurality of ribs 42 in the longitudinal direction.

The second recesses 44 formed in each line are displaced in the longitudinal direction from the second recesses 44 formed in adjacent lines.

On the embossed surface 40 of such a surface structure, airflows along the longitudinal direction can be generated as indicated by dotted lines in FIG. 3.

In this case, as illustrated in FIG. 4, in the vicinity of an outermost surface of the embossed surface 40, minute vortices are generated between the embossed surface 40 and the airflows due to an effect of the first recesses 43 extending linearly, for example. Generation of the minute vortices enables the airflows along the longitudinal direction of the embossed surface 40 to run close to the outermost surface of the embossed surface 40 efficiently at a high flow speed.

In contrast, regarding airflows in a direction intersecting the airflows indicated by the dotted lines in FIG. 3, such as airflows along the transverse direction, minute vortices are not generated on the embossed surface 40 owing to an effect of the second recesses 44 not extending linearly in the embossed surface 40, for example. As a result, the airflows along the transverse direction become less likely to run to be drawn close to the outermost surface of the embossed surface 40. Friction occurs between the airflows along the transverse direction and the embossed surface 40 so that the flow speed becomes less likely to increase.

In this manner, the embossed surface 40 having the surface structure illustrated in FIGS. 3 and 4 enables the airflows along the longitudinal direction to more efficiently run at a higher flow speed than the airflows along the transverse direction. The embossed surface 40 of the directionality pattern illustrated in FIGS. 3 and 4 has such directionality in flowing easiness that airflows run along the outermost surface of the embossed surface 40 in one direction (the longitudinal direction) more easily than airflows in the other direction (the transverse direction). The embossed surface 40 illustrated in FIGS. 3 and 4 serves as the directionality pattern configured to accelerate the airflows along the longitudinal direction.

It is noted that a surface structure of a member that constitutes a surface such as the lower surface 10 of the vehicle body 2 may be different from the embossed surface 40 illustrated in FIGS. 3 and 4 but a plurality of protrusions of an identical shape may be arranged on the base surface 41 or a plurality of recesses (dimples) of an identical shape may be arranged in the base surface 41. However, with a processed surface of such a surface structure, it is difficult to obtain the directionality that makes airflows run more easily in one direction than in the other direction. The protrusions or the recesses (dimples) in such cases may have a hexagonal shape or may be depressions of a partly-cut spherical shape, for example.

The above-described embossed surface 40 of the directionality pattern illustrated in FIGS. 3 and 4 is formed on some of the plurality of panels and covers that constitute the lower surface 10 of the vehicle body 2 in such a manner that the longitudinal direction of the elongated ribs 42 coincides with the fore-and-aft direction of the vehicle body 2 so as to accelerate the airflows in the fore-and-aft direction of the vehicle body 2.

In this case, the plurality of ribs 42 are arranged in the fore-and-aft direction and the vehicle width direction of the vehicle body 2. Among the plurality of ribs 42 arranged in the vehicle width direction of the vehicle body 2, the plurality of first recesses 43 form the plurality of continuous linear gaps that continuously extend linearly along the fore-and-aft direction of the vehicle body 2 over the entire embossed surface 40 of the directionality pattern. Each adjacent pair of the second recesses 44 in the vehicle width direction are displaced from each other in the fore-and-aft direction of the vehicle body 2.

In FIG. 2 of this embodiment, the embossed surface 40 of the directionality pattern is disposed on some of the plurality of panels and covers disposed on the lower surface 10 of the automobile 1 as illustrated in FIG. 2, namely, the front under center panel 22, the rear under center panel 29, the left rear under side cover 27, and the right rear under side cover 28. In this embodiment, the embossed surface 40 of the directionality pattern is not disposed on the left front under side cover 23, the right front under side cover 24, the left center under side cover 25, and the right center under side cover 26.

On the front under center panel 22 disposed from the front edge of the vehicle body 2 to the front wheels 4, the embossed surface 40 of the directionality pattern is formed in a laterally symmetric range on a plane portion of the front under center panel 22 when a center of the vehicle body 2 in the vehicle width direction is regarded as a reference. The plane portion here may refer to a flat portion of the front under center panel 22 that is parallel to a flat road surface, for example. The embossed surface 40 of the directionality pattern is not formed on the left front under side cover 23 and the right front under side cover 24, which are disposed in the vehicle width directions of the front under center panel 22.

On a portion of the lower surface 10 of the vehicle body 2 that is at a front side of the front wheels 4, the embossed surface 40 of the directionality pattern is partly formed in a range of the center portion except the left and right end portions in the vehicle width directions.

On the rear under center panel 29 disposed from the rear edge of the vehicle body 2 to the rear wheels 5, the embossed surface 40 of the directionality pattern is formed in a laterally symmetric range on a plane portion of the rear under center panel 29 when the center of the vehicle body 2 in the vehicle width direction is regarded as a reference. The embossed surface 40 of the directionality pattern is also formed in a laterally symmetric range of the vehicle body 2 on a plane portion of the left rear under side cover 27 and a plane portion of the right rear under side cover 28, which are disposed in the vehicle width directions of the rear under center panel 29.

On a portion of the lower surface 10 of the vehicle body 2 that is at a rear side of the rear wheels 5, the embossed surface 40 of the directionality pattern is formed in a whole range of the left and right end portions and the center portion in the vehicle width directions. The embossed surface 40 of the directionality pattern is formed in the range including the portion at the rear side of the rear wheels 5.

The embossed surface 40 of the directionality pattern on the rear side of the lower surface 10 of the vehicle body 2 is formed in a wider range in the vehicle width directions than the embossed surface 40 of the directionality pattern on the front side.

In this case, the airflows that have run beneath the lower surface 10 of the vehicle body 2 are accelerated to advance along the fore-and-aft direction, which is a travel direction, in the center portion of the lower surface 10 of the vehicle body 2 in the vehicle width direction as indicated by bold lines in the airflows on the lower surface 10 of the vehicle body 2 in FIG. 2. This large amount of rapid airflows in the center portion in the vehicle width direction can draw in the airflows on the opposite sides of the center portion. As a result, in a left front corner, a right front corner, a left rear corner, and a right rear corner as well, the airflows along the fore-and-aft direction, which is the travel direction, become more likely to be accelerated. Airflow balance beneath the lower surface 10 of the vehicle body 2 becomes different from that of the case without the embossed surface 40 of the directionality pattern.

Figure 5:
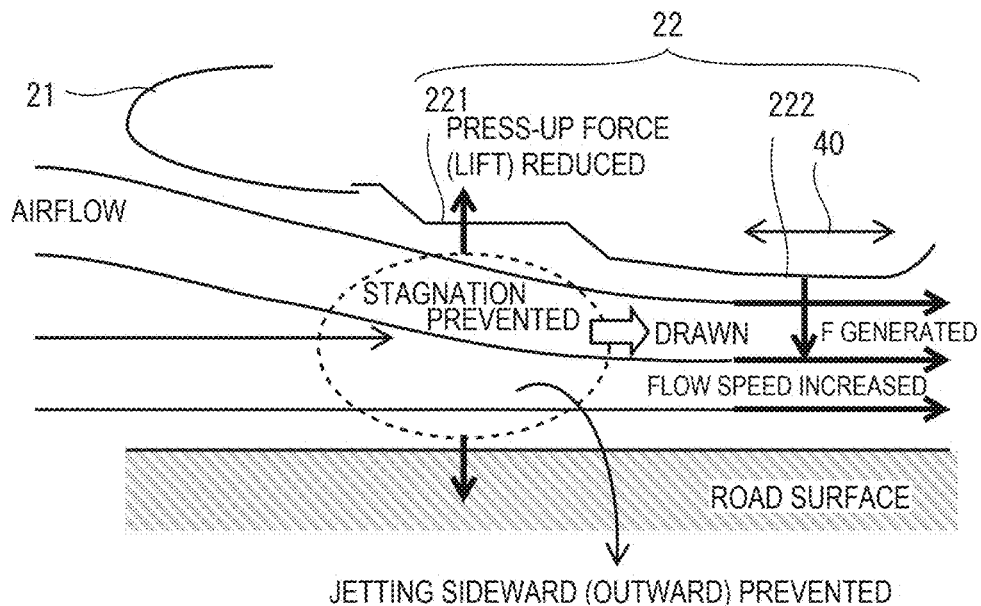
FIG. 5 is a diagram illustrating a front under center panel including the embossed surface of the directionality pattern in FIGS. 3 and 4, and airflows in the vicinity of the front under center panel.

FIG. 5 is a diagram illustrating the front under center panel 22 including the embossed surface 40 of the directionality pattern in FIGS. 3 and 4, and airflows in the vicinity of the front under center panel 22. FIG. 5 illustrates a cross section of the center in the vehicle width direction of the portion of the vehicle body 2 that is at the front side of the front wheels 4.

The front under center panel 22 in FIG. 5 extends rearward from the lower end of the front bumper 21. The front under center panel 22 includes plane portions 221 and 222 at different levels. The embossed surface 40 of the directionality pattern is formed substantially wholly on the rear plane portion 222. The longitudinal direction of the elongated ribs 42 on the embossed surface 40 of the directionality pattern is along the fore-and-aft direction.

In use of the front under center panel 22 of a shape lowered from the front bumper 21 to multiple levels, an interval between the lower surface 10 of the vehicle body 2 and the road surface is narrowed rearward of the vehicle body 2.

The airflows that have run from the front of the vehicle body 2 beneath the vehicle body 2 become more likely to be stagnant from the front bumper 21 to the vicinity of the front plane portion 221 of the front under center panel 22. When the airflows are stagnant, an air pressure at the spot becomes more likely to increase.

In this embodiment, the embossed surface 40 of the directionality pattern configured to accelerate the airflows in the fore-and-aft direction is formed on the rear plane portion 222 of the front under center panel 22 that is at a rear side of the stagnant spot. The embossed surface 40 of the directionality pattern increases a speed and a flow rate of airflows along the rear plane portion 222 of the front under center panel 22. When the speed and the flow rate of the airflows passing between the rear plane portion 222 of the front under center panel 22 and the road surface are increased, a force for pulling down the rear plane portion 222 becomes more likely to be applied to the rear plane portion 222.

When the flow speed between the rear plane portion 222 of the front under center panel 22 and the road surface is increased to lower an air pressure, air in front of the plane portion 222 is more likely to be drawn. Airflows are efficiently drawn from the stagnant spot from the front bumper 21 to the vicinity of the front plane portion 221 of the front under center panel 22. When an amount of air stagnant in the stagnant spot is decreased, a force that is about to press up the front under center panel 22, for example, that is generated by the pressure at the stagnant spot is reduced. Moreover, an amount of air that is about to run from the stagnant spot outward (in a direction orthogonal to the surface of paper) in the vehicle width directions, for example, can be reduced.

As a result, the force for pressing up the portion of the vehicle body 2 that is at the front side of the front wheels 4 is reduced, the front of the vehicle body 2 becomes less likely to float, gripping performance by the front wheels 4 is prevented from being lowered, and steering responsiveness by the automobile 1 becomes less likely to be degraded. A decrease in down force is reduced. Grounding feeling and steering responsiveness can be improved.

Some of the airflows running under the left front under side cover 23 toward the front wheels 4 strike against the front wheels 4, and then, the airflows become more likely to be drawn toward the front under center panel 22. Some of the airflows running under the right front under side cover 24 toward the front wheels 4 strike against the front wheels 4, and then, the airflows become more likely to be drawn toward the front under center panel 22. Thus, it can be expected to reduce airflows running outward in the vehicle width directions after striking against the front wheels 4.

Figure 6:
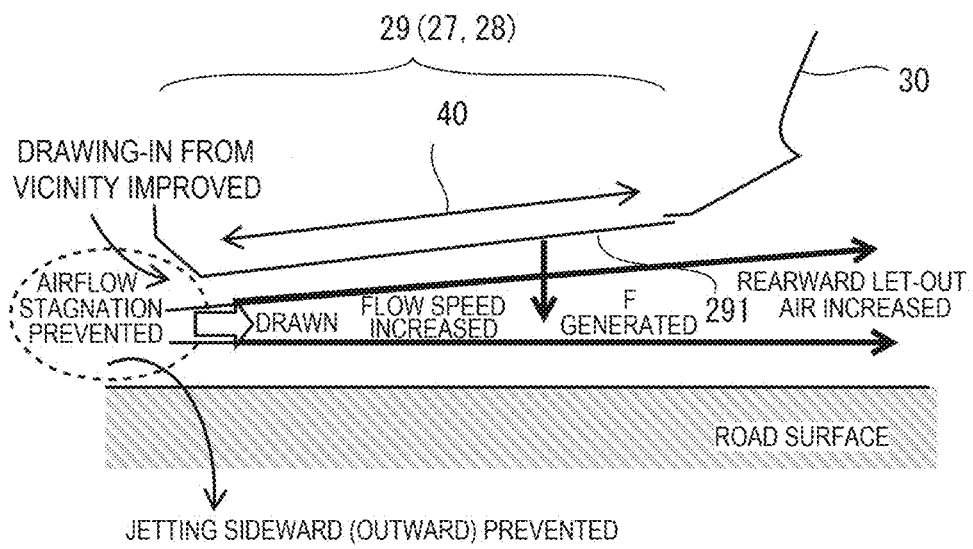
FIG. 6 is a diagram illustrating a rear under center panel including the embossed surface of the directionality pattern in FIGS. 3 and 4, and airflows in the vicinity of the rear under center panel.

FIG. 6 is a diagram illustrating the rear under center panel 29 including the embossed surface 40 of the directionality pattern in FIGS. 3 and 4, and airflows in the vicinity of the rear under center panel 29. FIG. 6 illustrates a cross section of the center in the vehicle width direction of the portion of the vehicle body 2 that is at the rear side of the rear wheels 5. A cross section of the left rear under side cover 27 and a cross section of the right rear under side cover 28 may be substantially the same as FIG. 6.

The rear under center panel 29 in FIG. 6 extends from a lower end of the rear bumper 30 to the wheelhouses for the rear wheels 5, not illustrated. The rear under center panel 29 includes a plane portion 291 inclined to rise rearward. The embossed surface 40 of the directionality pattern is formed substantially wholly on the plane portion 291. The longitudinal direction of the elongated ribs 42 on the embossed surface 40 of the directionality pattern is along the fore-and-aft direction.

In use of the rear under center panel 29 including the plane portion 291 inclined to rise rearward in this manner, the interval between the lower surface 10 of the vehicle body 2 and the road surface is slightly widened rearward of the vehicle body 2. Basically, air between the rear under center panel 29 and the road surface is more likely to be released rearward. Airflows that have run beneath the vehicle body 2 come to advance in the fore-and-aft direction and run out to the rear of the vehicle body 2.

Moreover, the embossed surface 40 of the directionality pattern is formed on the left rear under side cover 27 and the right rear under side cover 28 as well as the rear under center panel 29. The embossed surface 40 of the directionality pattern is formed on the rear portion of the lower surface 10 of the vehicle body 2 wholly in the vehicle width direction. Thus, the airflows running rearward of the vehicle body 2 wholly in the vehicle width direction jet out from the rear of the vehicle body 2 so that the rear of the vehicle body 2 becomes less likely to float wholly in the vehicle width direction.

Some of the airflows beneath the vehicle body 2 are blocked by the rear wheels 5 at the wheelhouses for the rear wheels 5, and then, the airflows become more likely to be drawn toward the rear under center panel 29. Thus, it can be expected to reduce airflows running outward in the vehicle width directions after striking against the rear wheels 5. Some of the airflows that have run outward in the vehicle width directions become more likely to return beneath the left rear under side cover 27 or beneath the right rear under side cover 28.

In this embodiment, the embossed surface 40 of the directionality pattern configured to accelerate the airflows in the fore-and-aft direction is formed on the plane portion 291 of the rear under center panel 29. The same applies to the left rear under side cover 27 and the right rear under side cover 28. In this manner, the embossed surface 40 of the directionality pattern is formed on the rear portion of the lower surface 10 of the vehicle body 2 wholly in the vehicle width direction. With the embossed surface 40 of the directionality pattern, the airflows jetting rearward from the rear portion of the lower surface 10 of the vehicle body 2 become airflows in the fore-and-aft direction, and the flow speed and the flow rate are increased. A force for pulling down the whole rear portion of the lower surface 10 of the vehicle body 2 becomes more likely to be applied to the rear portion of the lower surface 10.

When the flow speed between the plane portion 291 of the rear under center panel 29, for example, and the road surface is increased to lower the air pressure, air in front of the plane portion 291 is more likely to be drawn in. Even when airflows start to be stagnant at a front side of the rear portion of the lower surface 10 of the vehicle body 2, the airflows are efficiently drawn in at the stagnant spot so as to reduce an amount of stagnant air. Some of the airflows that strike against the rear wheels 5 and are about to run outward in the vehicle width directions become more likely to be drawn to the center of the vehicle body 2 in the vehicle width direction.

As a result, the rear of the vehicle body 2 that is at the rear side of the rear wheels 5 becomes less likely to float, gripping performance by the rear wheels 5 is prevented from being lowered, and stability of straightforward travel by the automobile 1 becomes less likely to be degraded. A decrease in down force is reduced. Grounding feeling and steering responsiveness can be improved.

As described above, in this embodiment, the vehicle body 2 of the automobile 1 capable of traveling includes under cover members composed of the panels and covers that constitute part of the lower surface 10 of the vehicle body 2, and the embossed surface 40 of the directionality pattern configured to accelerate airflows along the fore-and-aft direction of the vehicle body 2 is formed on plane portions of some of the under cover members.

In this embodiment, on the lower surface 10 of the vehicle body 2 of the automobile 1 capable of traveling, the under cover members are disposed on the front portion and the rear portion of the lower surface 10 of the vehicle body 2. The embossed surface 40 of the directionality pattern configured to accelerate the airflows along the fore-and-aft direction of the vehicle body 2 is formed on the plane portions of the under cover members. Since the embossed surface 40 of the directionality pattern configured to accelerate the airflows along the fore-and-aft direction of the vehicle body 2 is thus disposed on the plane portions of the under cover members, which are part of the lower surface 10 of the vehicle body 2, the airflows running beneath the vehicle body 2 are accelerated to advance along the fore-and-aft direction of the vehicle body 2 at least at the portions where the embossed surface 40 of the directionality pattern is formed. Beneath the vehicle body 2, the airflows along the fore-and-aft direction of the vehicle body 2 can be increased in speed or amount as compared with airflows along other directions, such as the vehicle width direction. In this embodiment, the airflows beneath the vehicle body 2 can be made different from those in a general case where no embossed surface 40 of the directionality pattern is formed on the lower surface 10 of the vehicle body 2.

In contrast, even when dimples without directionality for preventing separation are formed on part of the lower surface 10 of the vehicle body 2, for example, it is difficult to obtain the effect of making the airflows in the fore-and-aft direction of the vehicle body 2 have priority over airflows in other directions, and it is considered less likely to prevent traveling performance from being degraded by the airflows beneath the vehicle body 2.

In this embodiment, among the airflows beneath the vehicle body 2, the airflows in the fore-and-aft direction of the vehicle body 2 can have priority over airflows in other directions so that it can be expected to reduce air resistance and also to improve traveling performance.

In this embodiment, without changing an exterior design of the automobile 1 and a configuration of the vehicle body 2 and adding a large-scale aerodynamical part, the embossed surface 40 of the directionality pattern is disposed on surfaces of the resin members so that aerodynamics can be improved to enhance traveling performance, such as steering responsiveness and stability of straightforward travel. Particularly because the embossed surface 40 of the directionality pattern is formed on both of the front portion and the rear portion of the lower surface 10 of the vehicle body 2, airflows in the fore-and-aft direction uniformly strong from the front to the rear of the vehicle body 2 are more likely to be generated in the airflows beneath the vehicle body 2.

In particular, in this embodiment, on the front portion of the lower surface 10 of the vehicle body 2 from the front edge of the vehicle body 2 to the front wheels 4, the embossed surface 40 of the directionality pattern is formed on the plane portion 222 of the front under center panel 22. Thus, the embossed surface 40 of the directionality pattern at the front portion of the vehicle body 2 is disposed in the range that includes the center of the vehicle body 2 in the vehicle width direction and that is symmetric to the center of the vehicle body 2 in the vehicle width direction. The embossed surface 40 of the directionality pattern is formed in the range except for the portion at the front side of the front wheels 4. Thus, the airflows beneath the front portion of the lower surface 10 of the vehicle body 2 are efficiently made to run rearward from between the front wheels 4 so as to improve steering responsiveness of the automobile 1.

In this embodiment, on the rear portion of the lower surface 10 of the vehicle body 2 from the rear edge of the vehicle body 2 to the rear wheels 5, the embossed surface 40 of the directionality pattern is formed on the rear under center panel 29, the left rear under side cover 27, and the right rear under side cover 28. Thus, the embossed surface 40 of the directionality pattern at the rear of the vehicle body 2 is disposed in the whole and symmetric range of the vehicle body 2 in the vehicle width direction that includes the center of the vehicle body 2 in the vehicle width direction. Thus, the airflows beneath the rear portion of the lower surface 10 of the vehicle body 2 are efficiently made to run rearward from beneath the vehicle body 2 so as to improve stability of straightforward travel of the automobile 1.

As illustrated in FIG. 1, a specially processed surface 51 is disposed on a surface of a left side portion and a surface of a right side portion of the front bumper 21 disposed from the front surface 6 to the side surfaces 7 of the vehicle body 2.

The embossed surface 40 of the directionality pattern substantially the same as in FIGS. 3 and 4 may be disposed on the specially processed surface 51 in such a manner that the longitudinal direction is along the fore-and-aft direction. The embossed surface 40 of the directionality pattern substantially the same as in FIGS. 3 and 4 may be disposed on the specially processed surface 51 in such a manner that the longitudinal direction is inclined to rise rearward from the fore-and-aft direction. The embossed surface 40 of the directionality pattern configured to make airflows run along the surface more easily in one direction (the fore-and-aft direction) is formed on the surfaces of the side portions of the front bumper 21 disposed from the front surface 6 to the side surfaces 7 of the vehicle body 2.

In this manner, the embossed surface 40 of the directionality pattern basically along the fore-and-aft direction is formed on the left and right side portions of the front bumper 21 of the vehicle body 2. Thus, the airflows that have struck against the front surface 6 of the vehicle body 2 run along the front surface 6 of the vehicle body 2 toward each front corner of the vehicle body 2, and then, the airflows are more likely to run along the side surface 7 of the vehicle body 2 without being separated from the surface of the vehicle body 2 at the front corner. Since the flow speed is increased by the specially processed surface 51 at a rear side of the front corner of the vehicle body 2, the airflows running from the front surface 6 to the side surface 7 of the vehicle body 2 can be prevented from being separated from the surface of the vehicle body 2 at the front corner of the vehicle body 2.

The embossed surface 40 of the directionality pattern is formed on the left and right front under side covers 23 and 24. This prevents the airflows from running outward in the vehicle width directions from beneath the front under side covers 23 and 24. The airflows running along the side surfaces 7 of the vehicle body 2 that are not separated from the side surfaces 7 of the vehicle body 2 become less likely to be made turbulent by the airflows jetting out from beneath the front under side covers 23 and 24. The airflows running along the side surfaces 7 of the vehicle body 2 come to run more easily along the side surfaces 7 of the vehicle body 2 at the front wheels 4 and at a rear side of the front wheels 4.

With both of the embossed surface 40 of the directionality pattern on the side portions of the front bumper 21 described above and the embossed surface 40 of the directionality pattern on the front portion of the lower surface 10 of the vehicle body 2, the airflows that have struck against the front surface 6 of the vehicle body 2 are divided both downward and sideward, that is, divided into airflows toward the lower surface 10 of the vehicle body 2 and airflows toward the side surfaces 7, 7, in an efficient and balanced manner and come to run more easily. An amount of the airflows that are compressed or made stagnant in front of the vehicle body 2 can be reduced.

In contrast, for example, when the embossed surface 40 of the directionality pattern is not formed on the side portions of the front bumper 21, the airflows that have struck against the front surface 6 of the vehicle body 2 may become more likely to run toward the lower surface 10 of the vehicle body 2 than toward the side surfaces 7, 7 of the vehicle body 2. When more airflows run beneath the vehicle body 2, a floating effect of the front of the vehicle body 2 increases so that even when the above-described embossed surface 40 of the directionality pattern on the front portion of the lower surface 10 of the vehicle body 2 causes the airflows to run rearward efficiently, the effect of improving steering responsiveness of the automobile 1 may be reduced. In this embodiment, such a situation hardly occurs.

In this embodiment, on the under covers 29, 27, and 28 disposed from the rear edge of the vehicle body 2 to the rear wheels 5 disposed in the vehicle body 2, the embossed surface 40 of the directionality pattern is formed in the symmetric range with respect to the center of the vehicle body 2 in the vehicle width direction. Thus, the airflows beneath the rear portion of the lower surface 10 of the vehicle body 2 can be increased and made to run rearward efficiently so as to improve stability of straightforward travel of the automobile 1. Particularly because the embossed surface 40 of the directionality pattern is formed in the range including the portion at the rear side of the rear wheels 5, the airflows running rearward from beneath the vehicle body 2 can be increased so efficiently that the effect of improving the stability of straightforward travel of the automobile 1 is easily enhanced.

Although the above-described embodiment is a suitable example of the embodiment for the disclosure, the disclosure is not limited to this embodiment but may be modified or altered in various manners without departing from the subject matter of the disclosure.

In the above-described embodiment, on all of the under covers 29, 27, and 28 disposed on the rear portion of the lower surface 10 of the vehicle body 2, the embossed surface 40 of the directionality pattern is formed in the symmetric range with respect to the center in the vehicle width direction as the reference.

Alternatively, for example, among the under covers 29, 27, and 28, the embossed surface 40 of the directionality pattern on the rear portion of the lower surface 10 of the vehicle body 2 may be formed on the rear under center panel 29 in the symmetric range with respect to the center in the vehicle width direction as the reference. However, in this case, on opposite ends of the rear portion of the lower surface 10 of the vehicle body 2 in the vehicle width directions, the embossed surface 40 of the directionality pattern does not produce the effect of guiding the airflows into the fore-and-aft direction so that the prevention effect of floating of the rear of the vehicle body 2 may be decreased. When the embossed surface 40 of the directionality pattern is formed on all of the under covers 29, 27, and 28, floating of the rear of the vehicle body 2 can be effectively prevented to obtain high stability of straightforward travel.

In the above-described embodiment, on the front under center panel 22 disposed on the front portion of the lower surface 10 of the vehicle body 2, the embossed surface 40 of the directionality pattern is formed in the symmetric range with respect to the center in the vehicle width direction as the reference.

Alternatively, for example, on all of the under covers 22, 24, and 25, the embossed surface 40 of the directionality pattern on the front portion of the lower surface 10 of the vehicle body 2 may be formed in the symmetric range with respect to the center in the vehicle width direction as the reference. However, in this case, at the front side of the front wheels 4, the airflows beneath the vehicle body 2 also come to run more easily in the fore-and-aft direction so that the effect of drawing some of the airflows toward the center of the vehicle body 2 in the vehicle width direction may be decreased. As in the above-described embodiment, when the embossed surface 40 of the directionality pattern is not formed on the under covers 24 and 25 on purpose, it can be considered to enhance the effect of causing the airflows running beneath the vehicle body 2 to pass between the plurality of front wheels 4 and advance rearward.

In the above-described embodiment, the embossed surface 40 of the directionality pattern is formed on the front portion and the rear portion of the lower surface 10 of the vehicle body 2.

Alternatively, for example, the embossed surface 40 of the directionality pattern may be formed on one of the front portion and the rear portion of the lower surface 10 of the vehicle body 2.

However, when the embossed surface 40 of the directionality pattern is formed on both of the front portion and the rear portion of the lower surface 10 of the vehicle body 2 in the symmetric range with respect to the center in the vehicle width direction as the reference, the airflows running beneath the vehicle body 2 come to run more easily from the front via the center portion to the rear of the vehicle body 2. In this embodiment, as illustrated in FIGS. 5 and 6, even though the front edge and the rear edge of the vehicle body 2 are inclined to be more separate from the road surface than the center portion is, the airflows that have run beneath the vehicle body 2 can smoothly advance beneath the vehicle body 2 along the fore-and-aft direction and run out rearward from the rear edge of the vehicle body 2. An under cover member including the embossed surface 40 of the directionality pattern may be disposed on the center portion of the vehicle body 2 in the fore-and-aft direction in a similar manner to the front and the rear of the vehicle body 2. However, in this embodiment, without such a member, the airflows can be made to run smoothly on the whole lower side of the vehicle body 2.

The invention claimed is:

1. A vehicle capable of traveling with an embossed surface of a directionality pattern, the vehicle comprising:
   a vehicle body having a lower surface that has a front portion and a rear portion, the vehicle body comprising one or more under cover members disposed on one or both of the front portion and the rear portion, wherein
   the embossed surface of the directionality pattern is formed on one or more plane portions of the one or more under cover members, the embossed surface of the directionality pattern being configured to accelerate an airflow along a fore-and-aft direction of the vehicle body, and wherein the embossed surface includes a plurality of transversely spaced rib sets with each rib set including a series of ribs arranged as to share a common central axis extending in the fore-and-aft direction.

2. The vehicle according to claim 1, further comprising front wheels, wherein
   the one or more under cover members comprise a front under member disposed on the front portion of the lower surface of the vehicle body, the front portion being a portion from a front edge of the vehicle body to the front wheels, the front under member being disposed on a center portion of the vehicle body in a vehicle width direction, and
   the embossed surface of the directionality pattern is formed on a plane portion of the front under member in a range including a center of the vehicle body in the vehicle width direction.

3. A vehicle capable of traveling with an embossed surface of a directionality pattern, the vehicle comprising:
a vehicle body having a lower surface that has a front portion and a rear portion, the vehicle body comprising one or more under cover members disposed on one or both of the front portion and the rear portion, wherein
the embossed surface of the directionality pattern is formed on one or more plane portions of the one or more under cover members, the embossed surface of the directionality pattern being configured to accelerate an airflow along a fore-and-aft direction of the vehicle body, the vehicle, further comprising rear wheels, and wherein
the one or more under cover members comprise a rear under member disposed on the rear portion of the lower surface of the vehicle body, the rear portion being a portion from a rear edge of the vehicle body to the rear wheels, the rear under member being disposed at least on a center portion of the vehicle body in a vehicle width direction, and
the embossed surface of the directionality pattern is formed on a plane portion of the rear under member at least in a range including a center of the vehicle body in the vehicle width direction.

4. The vehicle according to claim 2, further comprising rear wheels,
the one or more under cover members comprise a rear under member disposed on the rear portion of the lower surface of the vehicle body, the rear portion being a portion from a rear edge of the vehicle body to the rear wheels, the rear under member being disposed at least on a center portion of the vehicle body in the vehicle width direction, and
the embossed surface of the directionality pattern is further formed on a plane portion of the rear under member at least in a range including the center of the vehicle body in the vehicle width direction.

5. The vehicle according to claim 1, further comprising:
a front bumper member disposed from a front surface to side surfaces of the vehicle body, wherein
the embossed surface of the directionality pattern is formed on surfaces of side portions of the front bumper member so as to cause the airflow to direct in one direction along the surfaces of the side portions of the front bumper member.

6. The vehicle according to claim 2, further comprising:
a front bumper member disposed from a front surface to side surfaces of the vehicle body, wherein
the embossed surface of the directionality pattern is formed on surfaces of side portions of the front bumper member so as to cause the airflow to direct in one direction along the surfaces of the side portions of the front bumper member.

7. The vehicle according to claim 3, further comprising:
a front bumper member disposed from a front surface to side surfaces of the vehicle body, wherein
the embossed surface of the directionality pattern is formed on surfaces of side portions of the front bumper member so as to cause the airflow to direct in one direction along the surfaces of the side portions of the front bumper member.

8. The vehicle according to claim 4, further comprising:
a front bumper member disposed from a front surface to side surfaces of the vehicle body, wherein
the embossed surface of the directionality pattern is formed on surfaces of side portions of the front bumper member so as to cause the airflow to direct in one direction along the surfaces of the side portions of the front bumper member.

9. An under cover member comprising:
a plane portion having an embossed surface of a directionality pattern, the embossed surface of the directionality pattern being configured to accelerate an airflow along a fore-and-aft direction of a vehicle body of a vehicle capable of traveling, wherein
the under cover member is configured to be disposed on at one or both of a front portion and a rear portion of a lower surface of the vehicle body, and wherein the embossed surface has a plurality of transversely spaced rib sets that define therebetween a plurality of constant lateral width, linear extending flow channels that are uninterrupted in the fore-and-aft direction over the entire embossed surface.

10. The vehicle according to claim 1, further comprising rear wheels, wherein
the one or more under cover members comprise a rear under member disposed on the rear portion of the lower surface of the vehicle body, the rear portion being a portion from a rear edge of the vehicle body to the rear wheels, the rear under member being disposed at least on a center portion of the vehicle body in a vehicle width direction, and
the embossed surface of the directionality pattern is formed on a plane portion of the rear under member at least in a range including a center of the vehicle body in the vehicle width direction.

11. The vehicle according to claim 4, wherein the embossed surfaces of the front and rear under members each extend to opposite sides of a vehicle width axis extending at the center of the vehicle body, with the embossed surface of the front under member having a lesser lateral length than the embossed surface of the rear under member.

12. The vehicle according to claim 1, wherein the embossed surface has a plurality of the transversely spaced rib sets that define therebetween a plurality of constant lateral width linear extending flow channels that are uninterrupted in the fore-and-aft direction over the entire embossed surface.

13. The vehicle according to claim 1, wherein side walls of the rib sets extend in parallel, straight lines as to define, in the fore-and-aft direction, continuous linear flow channels.

14. The vehicle according to claim 3, wherein the embossed surface has a plurality of transversely spaced rib sets that define therebetween a plurality of constant lateral width, linear extending flow channels that are uninterrupted in the fore-and-aft direction over the entire embossed surface.

15. The vehicle according to claim 1, wherein ribs of a common rib set have different linear lengths.

16. The vehicle according to claim 15, wherein the different linear length ribs in the common rib sets define a different length pattern than different linear length ribs in an adjacent one of the rib sets.

17. The vehicle according to claim 16, wherein the different length pattern of ribs in the rib sets results in a nested, rhombic arrangement pattern in the embossed surface.

18. The under cover member of claim 9, wherein the embossed surface includes a plurality of transversely spaced rib sets with each rib set including a series of ribs arranged as to share a common central axis extending in the fore-and-aft direction.

19. The under cover member of claim 9, wherein side walls of the rib sets extend in parallel, straight lines in the fore-and-aft direction.

20. The under cover member of claim 9, wherein ribs of a common rib set have different linear lengths.

* * * * *